United States Patent
Leveille

[11] Patent Number: 5,964,443
[45] Date of Patent: Oct. 12, 1999

[54] MOUNTING BRACKET SYSTEM FOR A REARVIEW MIRROR

[75] Inventor: Richard G. Leveille, Fort Gratiot, Mich.

[73] Assignee: CIPA - USA, Inc., Port Huron, Mich.

[21] Appl. No.: 08/910,792

[22] Filed: Aug. 13, 1997

[51] Int. Cl.[6] .................................................. H04M 1/00
[52] U.S. Cl. ........................................ 248/478; 248/292.12
[58] Field of Search ............................. 248/231.71, 468, 248/478, 479, 481, 231.81, 292.12, 316.4; 352/875, 872

[56] References Cited

U.S. PATENT DOCUMENTS

| | | | |
|---|---|---|---|
| 4,368,868 | 1/1983 | Urban | 248/549 |
| 4,755,033 | 7/1988 | Whitehead et al. | |
| 5,227,924 | 7/1993 | Kerper | 359/875 |
| 5,400,183 | 3/1995 | Rosser | 359/872 |
| 5,439,305 | 8/1995 | Santo | 403/76 |
| 5,566,030 | 10/1996 | Yue | 359/872 |
| 5,765,794 | 6/1998 | Chen | 248/292.12 |

*Primary Examiner*—Ramon O. Ramirez
*Attorney, Agent, or Firm*—Gifford, Krass, Groh, Sprinkle, Anderson & Citkowski, P.C.

[57] ABSTRACT

A mounting bracket system for a rearview mirror intended to be temporarily and readily affixed to a protruding surface of a watercraft or a vehicle. The instant invention finds particular advantage when a load is being towed or trailed and the normal rear line of sight is obscured. The mounting bracket of the instant invention is adapted to receive a conventional mirror assembly on one end, the other end terminates in a generally orthogonal, cylindrical appendage. The appendage is selectively oriented and contacted between two opposing clamping members. The first clamping member is affixed to a frame adapted to engage the protruding surface. The second clamping member is slidably displaceable relative to the first clamping member.

9 Claims, 3 Drawing Sheets

MOUNTING BRACKET SYSTEM FOR A REARVIEW MIRROR

BACKGROUND OF THE INVENTION

The present invention relates generally to a mounting bracket system for a rearview mirror adapted to be readily affixed to a vehicle. In particular, such mounting bracket system is particularly advantageous for use with motorized watercraft and utility vehicles. The pulling of a skier behind such a craft or the towing of a trailer behind a vehicle requires the use of a rearview mirror in a location on the craft or vehicle so as to permit viewing beyond the trailing load.

Mounting bracket systems for rearview mirrors are well known in the art. Prior mounting bracket systems have generally been designed to permanently affix a rearview mirror to the exterior of the vehicle and most often to an outer side panel of the vehicle, for example U.S. Pat. No. 5,636,245; U.S. Pat. No. 5,227,924; and U.S. Pat. No. 4,755,033. Another large class of prior art rearview mirror mounts pertains to affixing the mirrors to the interior windshield or interior roof of a vehicle, for example U.S. Pat. No. 5,455,716; and U.S. Pat. No. 5,439,305. These rearview mirror mounts are typically integral to the vehicle surface to which they are affixed. Thus, a vehicle or craft towing or pulling a load that obscures the operator's line of sight diminishes the utility of such integral mirrors. Furthermore, the retrofitting of such rearview mirrors to improve the rearview visibility of the operator is not readily accomplished.

Prior art rearview mirror mounts adapted to be readily affixed have largely been confined to hammering or lashing a mirror to a tree or pole, for example U.S. Pat. No. 5,383,061; and U.S. Pat. No. 5,400,183.

SUMMARY OF THE INVENTION

The instant invention constitutes a mounting bracket system for a rearview mirror including: a C-shaped mounting frame, the walls of the frame defining an interior space; a screw extending into the interior space in order to secure the frame to an intruding substrate; a first clamping member affixed to the exterior surface of the frame; a second clamping member slidably engaging the frame, such that the second clamping member is in opposition to the first clamping member; an elongated mounting bracket having two ends, the first end adapted to seat between the two clamping members, the second end adapted with means to secure a rearview mirror; and a means for fixing the position of said mounting bracket between the two clamping members.

DETAILED DESCRIPTION OF THE PREFERRED EMBODIMENTS

Figure 1:
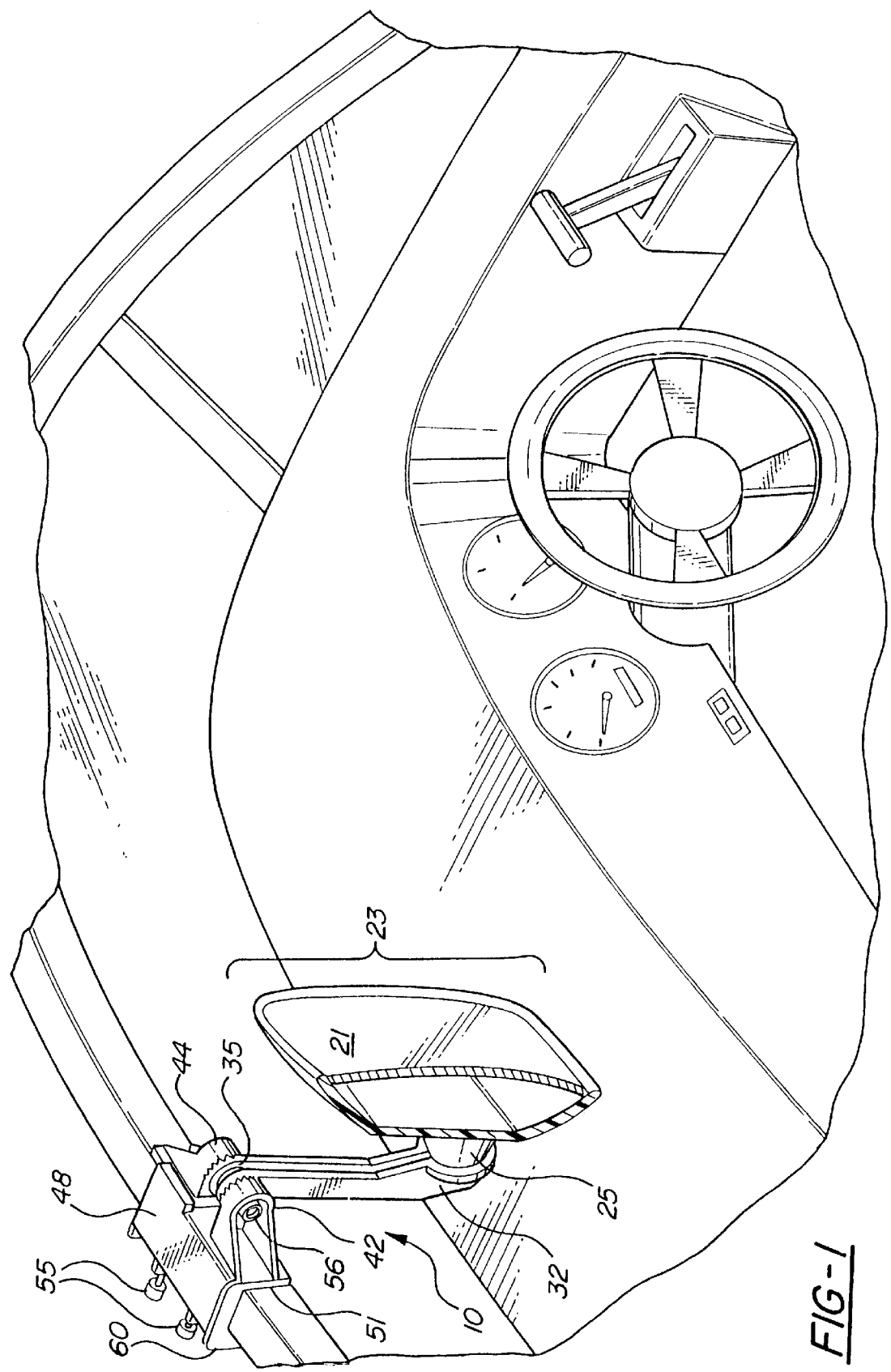
FIG. 1 is a perspective view showing a preferred embodiment of the mounting bracket system for a rearview mirror of the present invention in use affixed to a motorcraft windshield.

Referring now to FIG. 1, the mounting bracket system for a rearview mirror of the present invention, generally indicated at 10, in its normal use disposition is affixed generally to a protruding substrate S, which in FIG. 1 is a motorcraft windshield molding that the bracket system 10 is adapted to encompass. The preferred embodiment of the bracket system includes a mirror assembly 20 attached to a mounting bracket 30.

The mirror assembly 20 includes a conventional mirror 21. It is preferred that the mirror 21 be mounted in a protective housing 23 so as to prevent undue shock and abrasion to the mirror 21. The casing 23 includes a ball 25 adapted to fit into a complementary ball joint receptacle 32 of the elongated mounting bracket 30. A screw serves to retain the generally spherical ball 25 in the complementary socket 32 (not shown), while still providing complete rotation and limited angulation of the mirror 21 within the protective housing 23 about the screw axis. The other end of the elongated mounting bracket 30 terminates in a generally cylindrical appendage 35.

The generally cylindrical appendage 35 of the elongated mounting bracket 30 is adapted to seat between two clamping members 42 and 44. One clamping member 42, is stationary relative to a C-shaped mounting frame 48. The other clamping member 44 is slidably attached to the C-shaped mounting frame 48 such that the displacement between clamping members 42 and 44 is variable. Thus, at displacements between clamping members 42 and 44 greater than the cylindrical length of appendage 35 of the elongated mounting bracket 30, the elongated mounting bracket 30 is selectively rotatable about the longitudinal axis defined by the clamping members 42 and 44 and the cylindrical length of appendage 35. Upon reducing the displacement between clamping members 42 and 44 to the cylindrical length of the appendage 35, the elongated mounting bracket 30 is locked in a given rotational position. A screw 46 extends through a clearance hole in clamping member 42 and elongated mounting bracket appendage 35, and is secured in a threaded hole located in clamping member 44, thereby fixing the position of the elongated mounting bracket 30 between the clamping members 42 and 44.

Clamping member 44 is slidably displaceable relative to fixed clamping member 42. The fixed clamping member 42 is integral to a C-shaped mounting frame 48. The interior space 49 defined by the opposing surfaces 50 and 51 of the C-shaped mounting frame 48 is required to be sufficiently large to accommodate the dimensions of the intruding substrate S. At least one screw 55 is introduced through sidewall 60 of the C-shaped mounting frame 48, into the interior wall 49 in order to secure surface 51 against the substrate S. Optionally, a rectangular block having a footprint approximately that of sidewall 60 and having a feedthrough hole aligned with the screw 55 is inserted between interior wall 49 and the substrate S (not shown).

Figure 2:
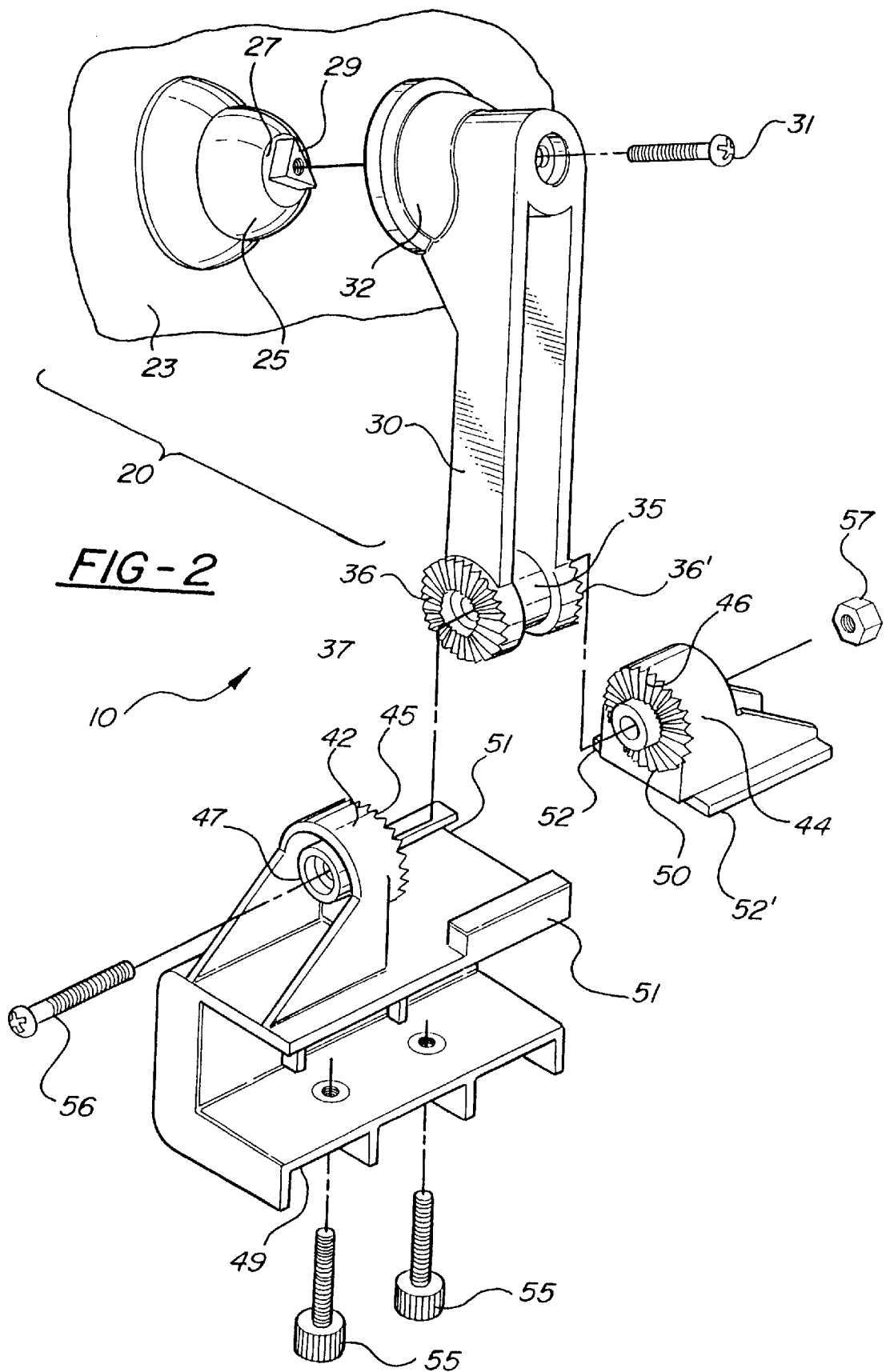
FIG. 2 is an exploded perspective view of the mounting bracket system for a rearview mirror depicted in FIG. 1.

In reference to FIG. 2 in particular, the means for securing the rearview mirror to the elongated mounting bracket 30 in the preferred embodiment of the instant invention is shown. The ball joint 25 of mirror frame backing 23 has a triangular cross-section indentation 27 at the pole of the hemispherical ball appendage 25. A complementary nut 29 is integrally affixed into the recess 27. A screw 31 engages nut 29 by a feedthrough hole through the end of the elongated mounting bracket 30, that terminates in the center of the complementary socket 32 to the spherical ball 25.

The generally cylindrical appendage 35 of the elongated mounting bracket 30 has circular opposing faces 36 and 36'. A concentric feedthrough hole forms a communicative passage 37 between the faces 36 and 36'. The opposing circular faces 36 and 36' seat against a complementary face 45 on the stationary clamping member 42 and a similar complementary face 46 on the slidably attached clamping member 44. Preferably, the opposing faces 36 and 36' of the cylindrical appendage 35 and the clamping member faces 45 and 46 are contoured so as to form radially extending gripping teeth 50. The gripping teeth function to increase the friction coefficient upon engagement of the complementary faces (i.e. 36–45 and 36'–46 or vice versa).

The slidably attached clamping member 44 floats in an opposing pair of grooves 51 by means of extending tongues 52 and 52'. The tongues 52 and 52' extend outwardly from the basal surface of the clamping member 44 and are undersized relative to the grooves 51 such that the clamping member 44 slides freely within the grooves 51. The selective displacement of the clamping member 44, as well as the mounting bracket 30 is limited by the engagement of the screw 56 with the nut 57 seated in the member 44 via the feedthrough hole 47 of the stationary clamping member 42, and the passage 37 of the elongated mounting bracket 30. Tightening of the screw 56 and the nut 57 functions to tension the clamping members and bracket against one another.

Figure 3:
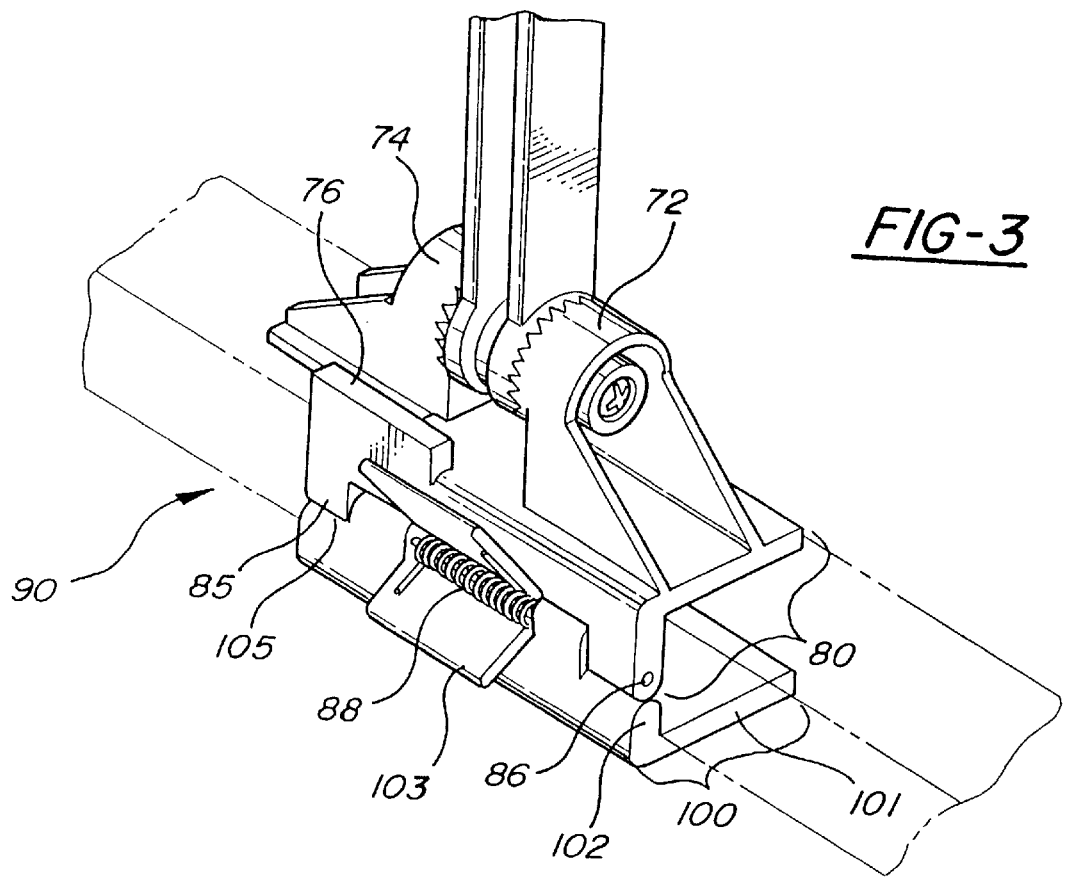
FIG. 3 is side perspective view of another embodiment of the instant invention.

In another embodiment of the instant invention, shown in FIG. 3, a stationary clamping member 72 and a slidably adjustable clamping member 74 are attached to one of the elements 80 of a clip pair 90. The clip element 80 has an extending wing portion 81, onto which the stationary clamping member 72 and the track 76 in which the adjustable clamping member 74 are incorporated. The extending wing portion 81 connects to a generally orthogonal spanner portion 82. The spanner portion 82 flares away from the extending wing portion to form a grip portion 83. Between the spanner portion 82 and the grip portion 83 of clip element 80 lies an interface 84. The interface 84 is modified with a series of notches 85 and feedthrough holes (not shown), in order to accommodate a hinge pin 86. A further notch, shown as notch 87, is adapted to accommodate a spring 88 which is concentric with the hinge pin 86. The complementary clip element 100 similarly has an extending wing portion 101, a spanner portion 102 and a grip portion 103. The interface 104 between the spanner portion 102 and grip portion 103 is modified with a notch 107. The notch 107 is complementary to notch 87 of element 80. Notches 105 cut along the interface 104 of clip element 101 are offset from notches 85 in clip member 80, such that the notches 85 and 105 intermesh the hinge pin 86 thereby engaging both clip elements 80 and 100 and defines a pivot axis along the interfaces 84 and 104, respectively. The concentric spring 88 around the hinge pin 86 is tensioned so as to urge the extending wing portions 81 and 101 of the clip 90 towards one another.

Figure 4:
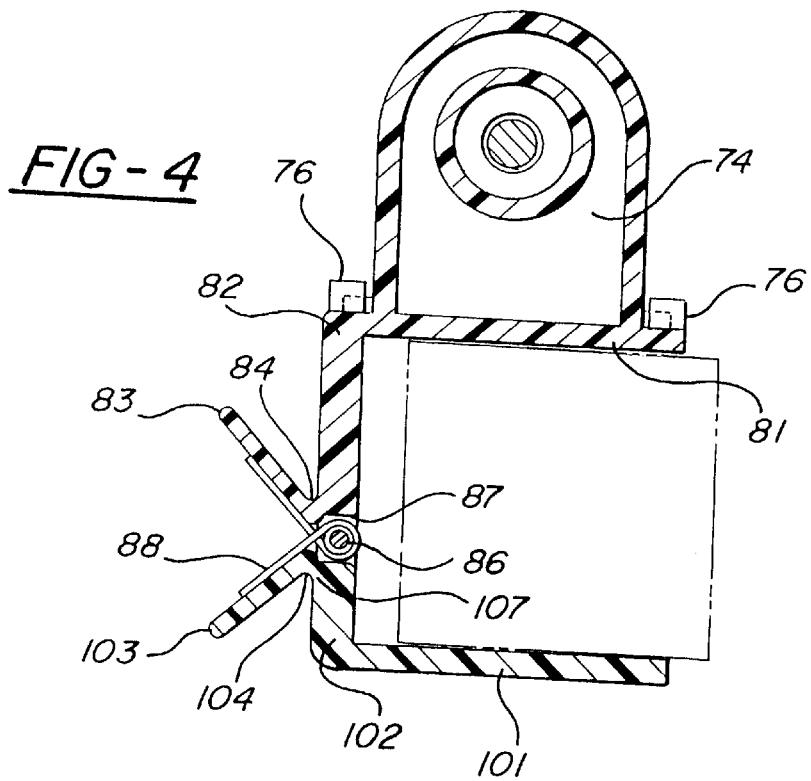
FIG. 4 is a cross-sectional view along the planar surface x-x' of FIG. 3.

A cross-sectional view of the embodiment of the instant invention through the planar surface denoted x-x' of FIG. 3 is shown in FIG. 4. In reference to FIG. 4, the clip 90 engages a generic substrate S by applying force to grip portions 83 and 103 so as to urge them toward one another, thereby creating an opening for receiving the substrate S between the extended wing portions 81 and 101. The maximal size of the substrate S which may be encompassed by the clip 90 is defined by the length of spacer portions 82 and 102 of clip elements 80 and 100, respectively.

It is preferred that the mounting bracket system described herein utilize component parts that are composed of an injection moldable thermoplastic resin such as, illustratively, polycarbonate, high density linear polyethylene or the like. Such components are readily formed into complex shapes, are shock and corrosion resistant. Optionally, a metallic nut (not shown) is embedded in an injection moldable thermoplastic component by conventional means to provide greater material strength yet still take advantage of processing properties of thermoplastic resins.

Other modifications of the invention may be made within the intended scope of the invention as set forth in the hereafter appended claims.

I claim:

1. A mounting bracket system for mounting a rearview mirror comprising:

a C-shaped mounting frame having first and second side sections having opposed planar surfaces and a connecting section extending generally normally to said planar surfaces and connecting said side sections so as to form an interior space bounded by said planar surfaces, wherein said first section has an outer surface and an inner surface, and said opposing second section has a threaded hole adapted to receive a screw;

a screw extendable through said threaded hole into the interior space;

a first clamping member affixed to the outer surface of said first section, said first clamping member having a first circular clamping face and a hole through the approximate center of said circular clamping face;

a second clamping member having a second clamping face and a hole through the approximate center of said second clamping face, said second clamping face slidably engaging the outer surface of said first section, such that the lateral displacement between said first and said second circular clamping faces is adjustable and said first and said second clamping faces are in opposition and generally concentric wherein the holes through the approximate centers of said first and second clamping faces defines a swivel axis;

an elongated mounting bracket having two ends, a first end adapted to selectively seat between said first clamping face and said second slidable clamping face, and means at the second end for mounting said rearview mirror, said means for mounting said rearview mirror including a generally spherical ball supported within a complementary socket provided in said rearview mirror, and retaining means for substantially preventing disengagement of said spherical ball from the socket; and a securing means for fixing the position of said mounting bracket about the swivel axis between said first and said second circular clamping faces.

2. The mounting bracket system of claim 1 wherein said first clamping member is integral with said top section of said C-shaped mounting frame, thereby defining a single component.

3. The mounting bracket system of claim 1 wherein said component is composed of an injection moldable thermoplastic resin.

4. The mounting bracket system of claim 1 wherein said first clamping member having said first circular clamping face further comprises radially extending gripping teeth formed in said first circular clamping face.

5. A mounting bracket system suited for attachment of a rearview mirror by a ball joint means attached to the first end of a bracket, said bracket being selectively hingeably rotatable and fixable about the second end of said bracket wherein the improvement is: a first clamping member having a first clamping face and a second clamping member having a second clamping face with said first and said second clanping faces being slidably disposed in opposition to one another and said second clamping face is selectively displaceable relative to said first clamping face along track, so as to secure the second end of said bracket therebetween.

6. The mounting bracket system of claim 5 further comprising the improvement of gripping teeth being integrated into said first and said second clamping faces.

7. The mounting bracket system of claim 5 further comprising the improvement of: an attachment means for affixing said first clamping member and said second clamping member to a substrate.

8. The mounting bracket system of claim 7 wherein the attachment means for affixing said first and said second clamping members to a substrate comprises:

a C-shaped mounting frame having first and second side sections having opposed planar surfaces and a connecting section extending generally normally to said planar surfaces and connecting said side sections so as to form an interior space bounded by said planar surfaces, the interior space adapted to encompass said substrate, wherein said first section has an upper surface adapted to attach said first and second clamping members and a lower surface, and said opposing second section has a threaded hole adapted to receive a screw; and a screw extendable through said threaded hole into the interior space.

9. The mounting bracket system of claim 7 wherein the attachment means for affixing said first and said second clamping members to a substrate comprises:

a first clip member having a first inner surface and an outer surface, the outer surface adapted to attach said first and said second clamping members;

a second clip member having a second inner surface hingeably attached to said first clip member such that the first inner contact surface and second inner surface are in opposition; and a spring urging the first and second inner surfaces together such that upon compression of said spring said first and second clip members are displaced relative to one another thereby defining an interior space between the first and second inner surfaces, said interior space adapted to encompass the substrate.

\* \* \* \* \*